Nov. 18, 1924.
F. D. CROWDER
1,515,933
INTERNAL COMBUSTION ENGINE
Filed Nov. 23, 1920
6 Sheets-Sheet 1
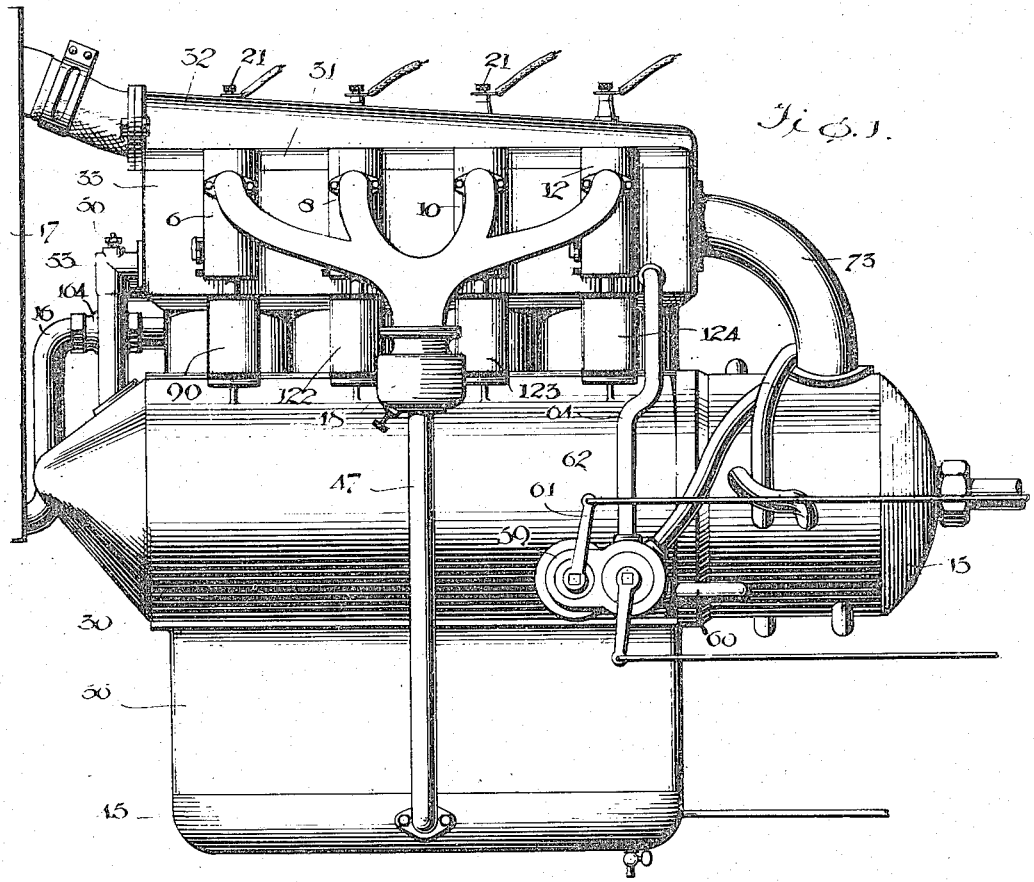
WITNESSES
INVENTOR
F. D. Crowder,
BY
ATTORNEYS Nov. 18, 1924.  1,515,933
F. D. CROWDER
INTERNAL COMBUSTION ENGINE
Filed Nov. 23, 1920  6 Sheets-Sheet 2
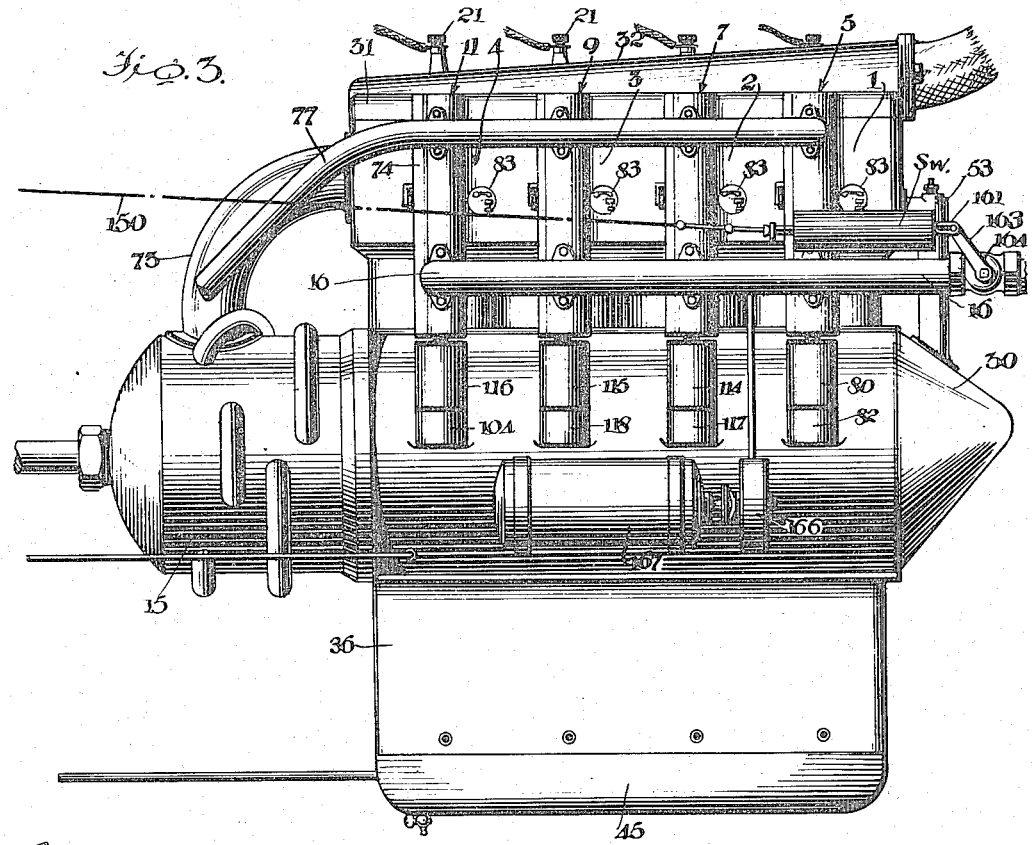
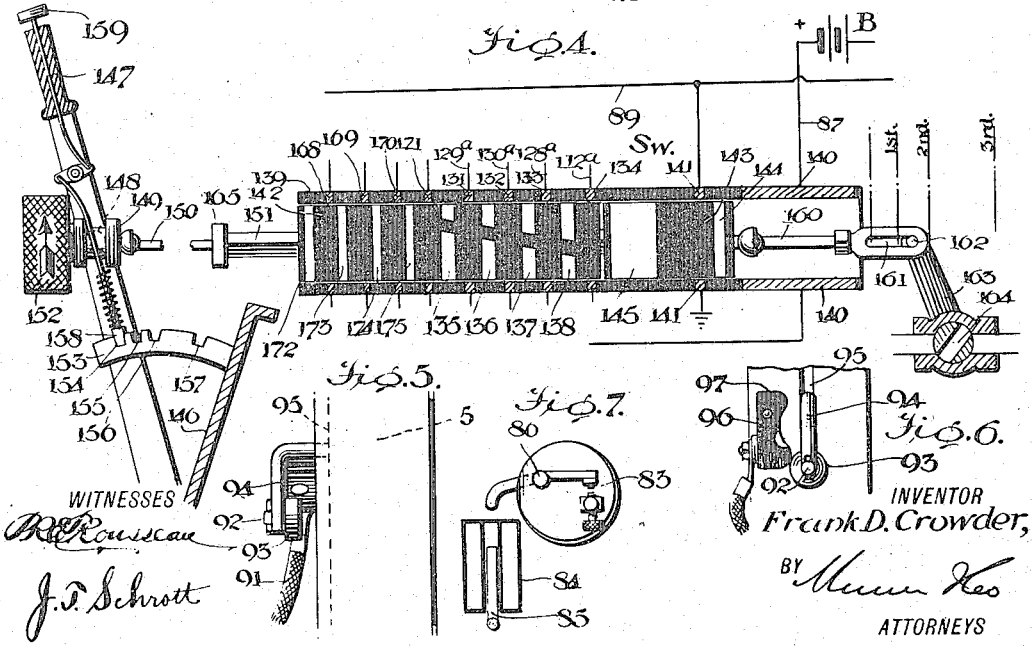

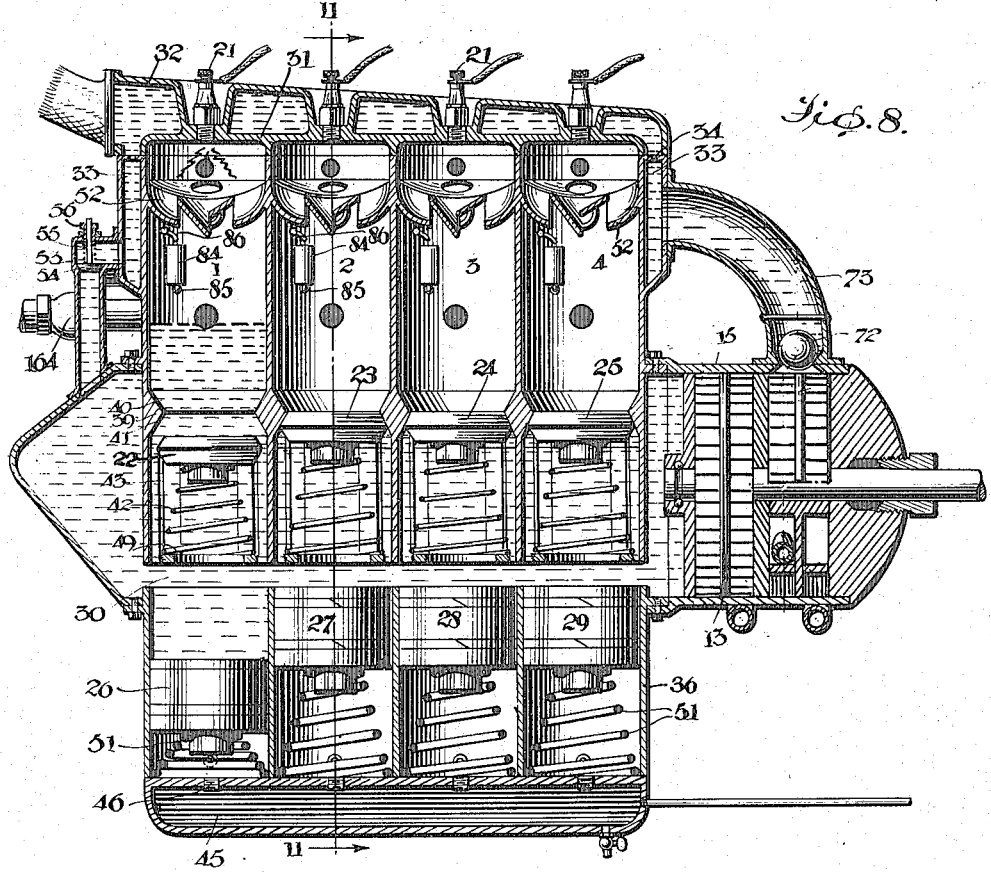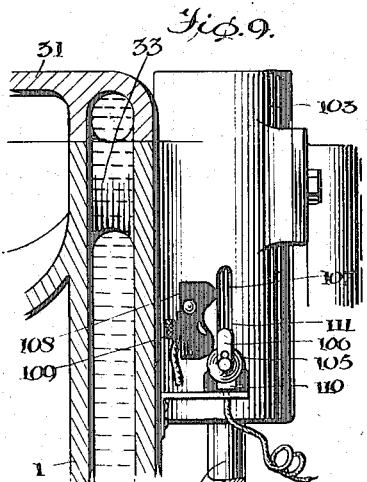

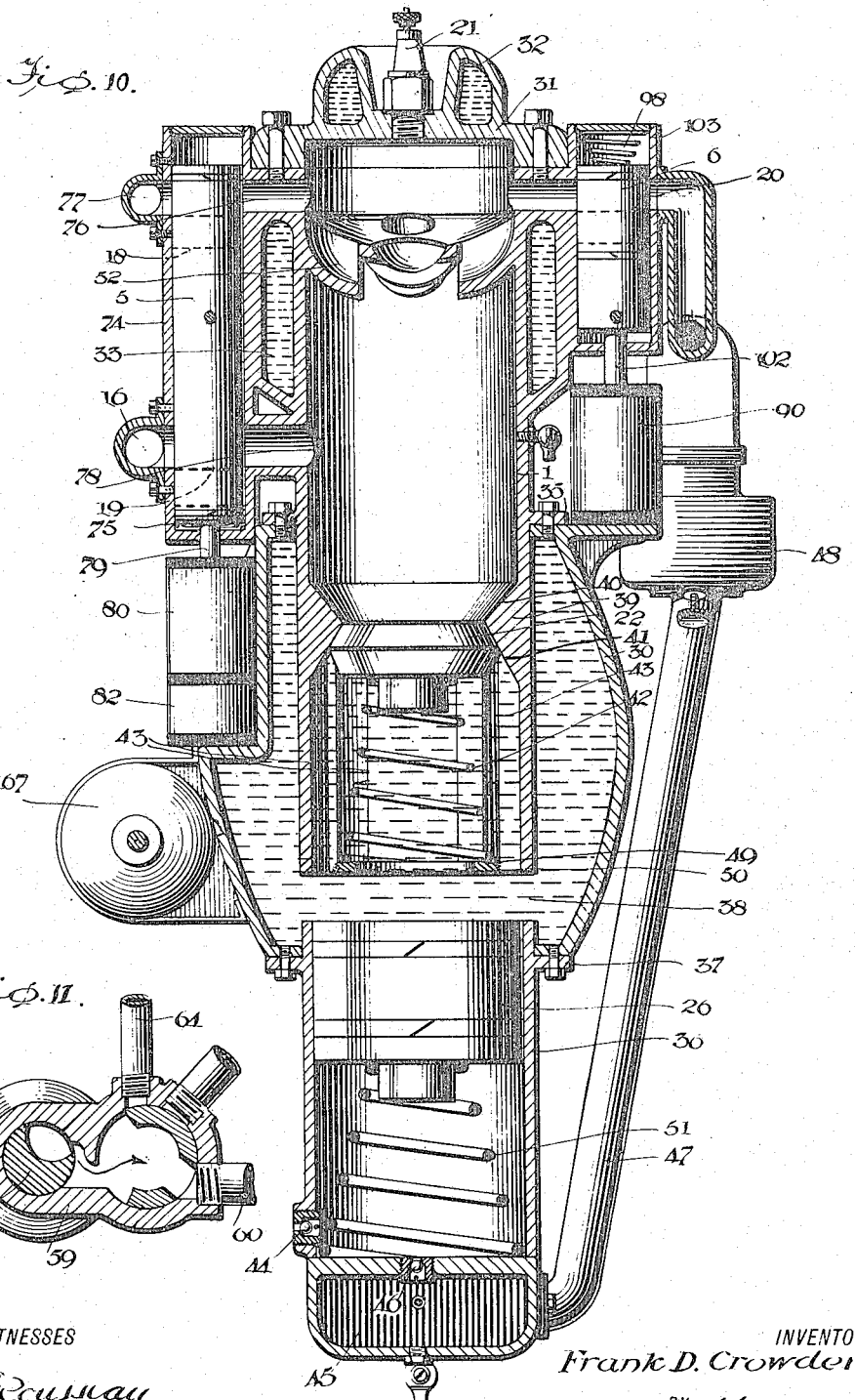

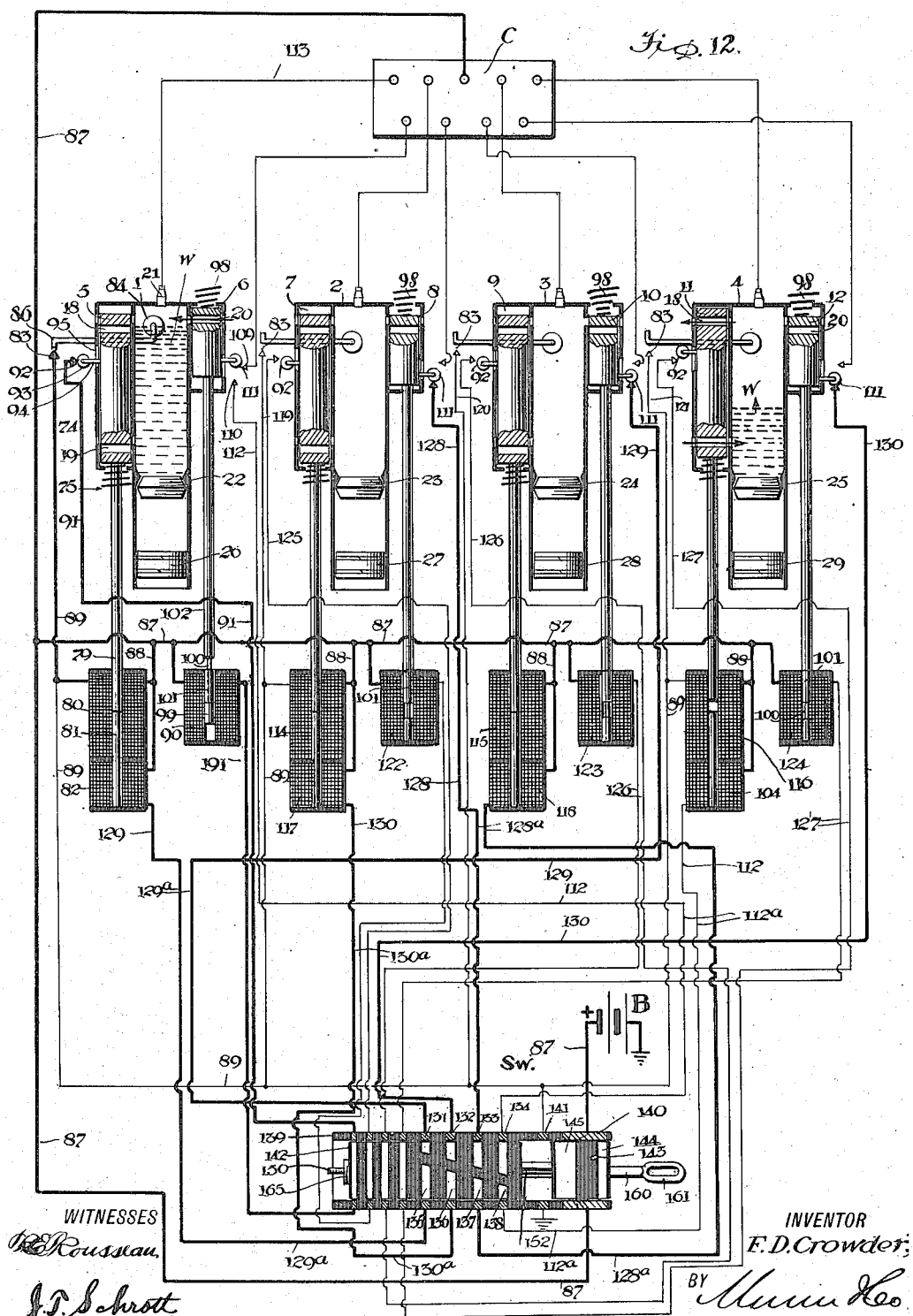

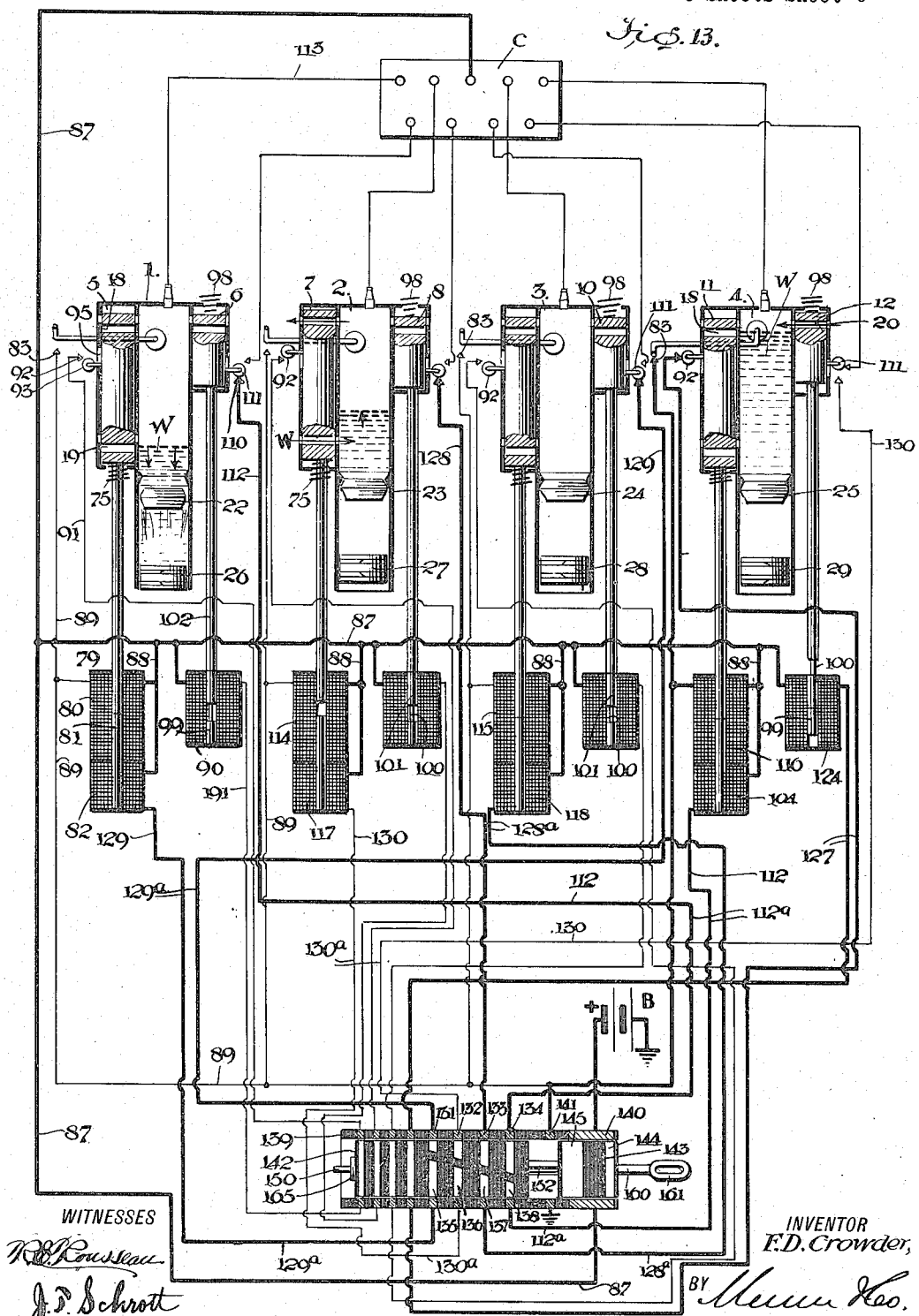

Patented Nov. 18, 1924.

1,515,933

UNITED STATES PATENT OFFICE.

FRANK D. CROWDER, OF SAN FRANCISCO, CALIFORNIA, ASSIGNOR OF ONE-FOURTH TO LORENZO G. WARFIELD, OF WASHINGTON, DISTRICT OF COLUMBIA; ONE-FOURTH TO L. R. WILHITE, OF HOUSTON, TEXAS; AND ONE-FOURTH TO H. H. HADEN, OF HARRIS COUNTY, TEXAS.

INTERNAL-COMBUSTION ENGINE.

Application filed November 23, 1920. Serial No. 426,064.

*To all whom it may concern:*

Be it known that I, FRANK D. CROWDER, a citizen of the United States, and a resident of San Francisco, in the county of San Francisco and State of California, have invented certain new and useful Improvements in Internal-Combustion Engines, of which the following is a specification.

My invention relates to improvements in internal combustion engines of the fluid piston type and it consists in the construction, combinations and mode of operation herein described and claimed.

One of the foremost objects of the invention is to provide a hydro-gas or internal combustion engine which generates power directly in an associated turbine, the turbine in turn driving an electric generator or other desired mechanism.

A further object of the invention is to provide an internal combustion engine embodying a circulating fluid serving the triple purpose of acting as the fluid piston, cooling agent for the cylinders, and medium for directly driving a turbine.

A further object of the invention is to provide a hydro-gas engine having exhaust and intake valves with electrical mechanism so associated with the latter that the exhaust valve of each cylinder controls its own intake valve, and the intake valve of each cylinder holds the exhaust valve of another cylinder in a predetermined position.

A further object of the invention is to provide a hydro-gas engine comprising a plurality of cylinders, each with an exhaust and an intake valve, the intake valve of one cylinder controlling electrical mechanism for holding the exhaust valve of another cylinder closed, but when said intake valve opens, the corresponding exhaust valve also opens to be later closed by instrumentalities set in operation through the rising fluid piston admitted by itself.

A further object of the invention is to provide an improved electric switch by means of which the functions of various important parts of the engine are initiated.

Other objects and advantages will appear in the following specification, reference being had to the accompanying drawings, in which:—

Figure 1 is a side elevation of the improved engine, viewed from the intake side, Figure 2 is a plan view, with the cover removed, Figure 3 is a side elevation viewed from the exhaust side, Figure 4 is a section, illustrating the association of the electric switch with the main valve, and showing the controlling means mounted on the instrument board of the automobile, Figure 5 is a front elevation of one of the exhaust valve cylinders showing its contact, Figure 6 is a side elevation of the same cylinder, again showing the contact, Figure 7 is a detail view showing the float-actuated contact which controls the working solenoid of the same cylinder, Figure 8 is a longitudinal section of the engine, Figure 9 is a detail view illustrating the combined spark and retaining solenoid contacts of one of the inlet valves, Figure 10 is a vertical cross section of one of the engine cylinders, Figure 11 is a detail sectional view of the control and shifting valves in Figure 1, Figure 12 is a diagram illustrating the first stages in the operation of cylinders No. 1 and No. 4, and Figure 13 is a similar diagram illustrating the second stage in the operation of cylinders 1 and 4.

A brief survey of the invention will acquaint the reader with the general construction and mode of operation of the engine, the details of each being described under appropriate headings below. There are four engine cylinders; 1, 2, 3 and 4. They have no pistons, as commonly known, connecting rods, guides, etc., neither is there a crank shaft or cam shafts for the exhaust and intake valves of the respective engine cylinders; 5, 6; 7, 8; 9, 10; 11, 12.

The fluid W, which ordinarily will be water but may be oil, or in fact, any other kind of fluid, serves three important purposes; while in the engine cylinders it is the fluid piston against which the force of a gas explosion is expended, it carries away the heat of the explosion thus keeping the cylinders cool, and it is usuable to drive an engine, such for example, as the turbine 15 before it returns to the inlet 16 from the radiator 17. The details of the turbine are immaterial to the invention herein disclosed and are therefore not specifically described.

Each exhaust valve 5, etc. has an exhaust port 18 for burnt gas leaving the engine cylinder, and an inlet port 19 for admitting water from the conduit 16 to fill the engine cylinder up to a predetermined high point. When such point is reached as illustrated in cylinder 1, Figure 12, the intake valve 6 is caused to open so that a charge of gas under compression may enter through the intake port 20.

This valve closes almost the instant it is opened and as it passes down on the closing movement, it creates a spark at the plug 21 to ignite the compressed charge of gas. The fluid piston W is forced down, past the large bottom valve 22, with which the other cylinders are similarly equipped at 23, 24 and 25, against the compressor piston 26, with which the other cylinders are likewise equipped at 27, 28 and 29, then into the reservoir 30 from which the water, now under pressure, flows into the turbine 15.

The engine details may now follow the above survey, the description of cylinder 1 sufficing for the rest, for they are all alike. The cylinder is of a substantially straight cylindrical shape, provided at the top with a cover 31 which is also common to all cylinders. This cover includes the water manifold 32, into which the hot water from the jacket 33 flows by means of openings 34, (Fig. 8) being conducted by the manifold to the top of the radiator 17 as plainly shown in Figure 1. A flange 35 supports the water reservoir 30 through securing bolts, the extension 36 of the cylinder also being provided with a flange 37 which is secured to the bottom of the reservoir.

There is preferably no connection between the cylinder 1 and its extension 36, so that the open space 38 is left unobstructed for the passage of the water into the reservoir after striking the compressor piston 26. The seat 39 of the large bottom valve 22 is of double conical shape at 40, 41.

Upon an explosion, the force is centered on the valve 22 by the first cone 40, whereupon the valve spring 42 yields to let the bottom valve 22 open so that the ejected water may enter the wide vertical grooves 43, into which it is directed by the other cone 41. The water being under considerable pressure will naturally pass down the grooves 43 and adjacent parts, very swiftly, striking the compressor piston 26 with equal force and causing the compression of air beneath that piston.

Air for compression is admitted by the valve 44, and the compressed air is let out into the compressed air reservoir 45 by the valve 46. The compressed air is used solely for the furnishing of a charge under pressure, to that end the air passing up through pipe 47 into the carbureter 48 where it is carburetted and stands in readiness to enter the working chamber when the intake valve 6 is opened.

Returning to the bottom valve 22; the spring 42 is supported on a ring 49 which is screwed or otherwise fixed in place at 50 into the bottom of the cylinder 1. A spring 51 holds the compressor piston normally up. This is a strong spring but exerts an upward force lesser than that produced by an explosion on the fluid piston.

Acknowledging the fact that water may be put under pressure and cannot be compressed unless the pressure is tremendously high, the provision of the spring 51 beneath the compressor piston 26 is made. Successive explosions at the top of the cylinder 1 will force added quantities of water into the reservoir 30. At each impulse the compressor piston 26 will sink lower and lower in its extension 36, compressing the spring 51 more and more but incidentally making room for said added quantity of water.

There are now two factors which put the water under considerable and sufficient pressure so that it may be used as a power fluid for driving the turbine 15 for instance; first, the force of the explosions behind the water, second, the force of the spring 51 moving the piston 26 inwardly. It should be understood that this is not an inherently high speed engine, but the two power factors named do operate to drive the turbine at a sufficiently high speed to in turn drive an electric generator.

A baffle 52, formed either integrally with or separately from the cylinder 1, prevents the excessive splashing of water into the combustion chamber. The baffle is near the top of the cylinder, and the fluid piston rises close to the bottom of the baffle. The baffle is of open construction as shown, so that the force of the explosion above may be exerted on the fluid piston beneath.

A governor 53 (Figs. 1 and 8) relieves excessive water pressure in the reservoir 30 under the circumstance that the turbine is unable to take care of it or would be damaged were such excessive pressure to continue. It consists simply of a pipe connection between the reservoir 30 and water jacket 33. The interposed valve 54 is normally held down by the spring 55 which can be adjusted at 56 for predetermined pressures. When the said pressure is reached in the reservoir, the spring 55 yields to let the valve 54 open so that the fluid may enter the water jacket and thus be shunted from the turbine.

The controlling of the engine is accomplished by the control valve 57 in the valve casing 59 at the side of the engine in Figure 1. This valve controls the fluid flow from the reservoir 30 into the pipe 60 leading into the turbine casing 15. This valve has handle and rod connections 61, 62 through which it is actuated by the operator.

The valve mechanism is described in part under the brief survey at the beginning, but the details of construction are brought out here. First, take the exhaust valve 5. It reciprocates in the cylinder 74; it is pressed upwardly by the spring 75 to place its gas exhaust and water inlet ports 18 and 19 in communication with corresponding ports 76 of the exhaust manifold 77, and 78 of the inlet conduit 16, and moved downwardly through the attraction of its stem 79 by the working solenoid 80.

The fixed core 81 partly occupies the working solenoid and completely occupies the retaining magnet 82. The cylinder 1 controls the energization of its own working solenoid 80 through its float contact 83, and that is so of the rest of the cylinders.

Assume the working solenoid 80 to be de-energized; the spring 75 presses the exhaust valve 5 up, opening the gas exhaust and water inlet ports. When the fluid piston reaches the float 84, the latter rises on its guide 85 striking the arm of the contact crank 86 and moving the points of the float contact 83 into engagement. The working solenoid is then energized by a circuit completed as follows: current from the positive pole of battery B over the main positive wire 87, branch 88, through the working solenoid 80, common negative wire 89, contact 83 to ground at the engine and so back to the negative pole of the battery. The energization of working solenoid 80 attracts the stem 79, closing the valve 5 against the tension of spring 75 and shutting off both ports 18 and 19.

The closing movement of exhaust valve 5 opens the gas intake valve 6 through the energization of the intake solenoid 90 in this manner: Current flows from the positive pole of the battery B over wire 87 to the winding of the intake solenoid, over negative wire 91 through the intake contact 92 to ground at the engine and so back to the negative pole of the battery. The energization of the intake solenoid 90 is but momentary because the intake contact 92 remains complete only for a very short time.

It consists of a roller 93 (see Figures 5 and 6) on an arm 94 carried by the exhaust valve 5 and working in a slot 95 in the cylinder 74. The pivotally mounted insulating base 96 of the companion contact point is so constructed that the roller will not engage the contact point on an upward movement.

When the roller 93 strikes the upper shoulder 97 the insulating base 96 is rocked to the left on its pivot and placing the free contact point directly into the path of the roller 93 to be engaged thereby on the downward movement. The circuit through the intake solenoid 90 remains only as long as the roller 93 and its contact remain in engagement and when the lowermost position of the valve 5 is reached, this circuit has been broken whereupon the spring 98 presses the intake valve 6 to its normally closed position.

The movable core 99 of the intake solenoid 90, has a reduced stem 100 which operates in the fixed core 101 and connects the movable core with the stem 102 of the intake valve. The energization of the intake solenoid 90 attracts the movable core upwardly to open the intake valve as distinguished from the closing of the exhaust valve 5 by the attraction of its core 79.

A casing 103 houses the intake valve 6 and its closing spring 98. The attraction of the core 99 by the closure of the circuit of the intake solenoid by the engagement of the contact 92 and the consequent opening of the intake valve 6, enables the introduction of a combustible charge under pressure into the explosion chamber above the fluid piston now at the limit of its inward movement. The closing intake valve produces its own spark at the plug 21 and at the same time energizes the retaining magnet 104 of cylinder 4.

The spark and retaining contact 111 by which the foregoing functions are performed, comprises a roller 105 on the arm 106 which is carried by the intake valve 6 and works in the slot 107 in the side of the casing 103. There is a pivoted insulating base 108 which carries the terminal 109 at which the high tension spark circuit is completed on the downward movement of the roller 105. This insulating base and terminal operates in the same manner as does the base 96 in Figure 6; a contact is made only on the down stroke.

After the roller 105 reaches the normal position, it engages the terminal 110 and remains there with some degree of permanency energizing the retaining magnet 104 in this manner: Current flows from the positive pole of battery B over the common positive wire 87 to the retaining magnet 104, over negative return wire 112 to the spark and retaining contact 111 to ground at the engine and so back to the negative pole of the battery.

Current for the production of the spark is furnished the coil, generally indicated C, by the main positive wire 87 and when the low tension circuit is completed at the terminal 110, current is made to flow in the high tension circuit 113 and thus a spark is produced at the plug 21. This circuit is grounded at the plug as is customary in practice. For the purposes of the description of the electrical system, the various solenoids, magnets and wires of the three remaining engine cylinders must be specifically described although the operation of each is precisely like that of cylinder 1. Cylinders 2, 3 and 4 have working solenoids 114, 115 and 116, the first two including retaining magnets 117 and 118. The retaining magnets 82 and 104 of cylinders 1 and 4, have already been mentioned.

The float contacts 83 require no separate designation. They control the passage of current from the main positive wire 87 through the various working solenoids in the negative wires 119, 120 and 121 in the respective instances. Similarly, the intake contacts 92, which require no separate designation, control the passage of current from the main positive wire 87 through the intake solenoids 122, 123 and 124 to the negative return wires 125, 126 and 127.

The retaining contacts 111 of the intake valves 6, 8, 10 and 12 control the passage of current from the main positive wire 87 through the retaining magnets 104, 118, 82 and 117 to return wires 112, 128, 129 and 130. Considering these wires in the order that they emanate from the retaining magnets 82, 117, 118 and 104, 129 branches off at 129$^a$, 130 at 130$^a$, 128 at 128$^a$ and 112 at 112$^a$, these branches extending to the main electric switch Sw, which has opposing sets of contacts 131, 132, 133 and 134 to receive them. These contacts are bridged by rings 135, 136, 137 and 138 to complete the current paths. In tracing the circuit of the retaining magnets 82, etc., the reader may ignore the branches 129$^a$ etc., which run to the main switch, and follow the main wires 129, etc. to their destination. This will simplify matters somewhat because it is readily seen that the branches 129$^a$, etc. only run to the switch then back again to the main wire.

Considering the construction of the switch Sw; it comprises an insulating cylinder 139 in which the contacts 131, etc., are fixed. It has main contacts 140 at which separated ends of the main positive wire 87 terminate. There are working solenoid contacts 141, one of which is connected to the common negative return wire 89, the other being grounded.

Inside of the contact cylinder 139 are movable insulating plugs 142 and 143, each separate from the other, and the former carrying the bridge rings 135 etc. These rings are normally out of engagement with the contacts 131, etc. that is to say, when the engine is at rest, but are permanently in engagement when the engine is in operation. The latter carries rings 144 and 145, respectively to bridge the contacts 140 and 141.

Mounted on the instrument board 146, or at any other convenient place, is the lever 147 by means of which the contact plugs are shifted. The lever has a pin 148 working in the groove of a collar 149 on the flexible shaft 150 which extends to the non-circular shaft 151. At first this shaft slides within the contact plug 142, but later this plug is turned through the medium of the non-circular shaft and the flexible shaft 150, the knurled button 152 being provided for the last purpose.

A quadrant 153 has notches 154, 155, 156 and 157 to be engaged by the latch 158. The latch is disengaged by pressing on the button 159. The forward movement of the lever 147 moves the contact plug 143 correspondingly, until the shoulder 165 engages the plug 142; from then on both move together.

This plug has a stem 160 with a head having a deep slot 161 occupied by the pin 162 on the handle 163 of the main water valve 164. This valve is situated in the inlet conduit 16, between the radiator 17 and the first exhaust valve 5. The contact cylinder 139 includes another series of contacts 168, 169, 170 and 171 to be bridged by contact rings 172, 173, 174 and 175 on the plug 142.

The contacts and rings mentioned control the intake solenoids 90, etc., it being observed that the wires 91, etc. from these solenoids run to the various contacts mentioned. The purpose of these contacts is to prevent energization of all of the intake solenoids at the time that the exhaust valves 5 etc. are drawn down by the energization of the working solenoids 80 etc. At this time it is well to consider the operation of the engine.

Assume the engine to be at rest. The main water valve 164 is closed as in Figure 4. The main switch Sw is open, the lever 147 is drawn back to the latch notch 154 and the whole electrical system is de-energized. Consequently, all of the exhaust valves 5, 7, 9 and 11 are up, because they are pressed into such position by the springs 75, and the gas exhaust and water inlet ports 18 and 19 are open to the cylinders 1, 2, 3 and 4.

But all of the gas intake valves 6, 8, 10 and 12 are closed because they are pressed down by their springs 98. Move the lever 147 to the first notch 155. This moves the plug 143 far enough to engage the ring 144 with the main contacts 140 then the main positive wire 87 is closed at the main switch Sw in readiness for the completion of the first circuit.

This occurs when the lever 147 is moved into the second notch 156 which brings the ring 145 into engagement with the working solenoid contacts 141, completing the following circuit: Current flows from the positive pole of battery B over main positive wire 87 past the switch contacts 140, 144, to all of the branches 88 through the working solenoids 80, 114, 115 and 116 to the negative return wire 89, contacts 141 and 145 to ground, and so back to the negative pole of the battery. All of the working solenoids are thus energized and the exhaust valves 5, 7, 9 and 11 are drawn down to the closed positions.

The switch contact plug 142 is still in the original position, not having yet been engaged by the shoulder 165 of the non-circular shaft 151. The base of the slot 161 in the head of the stem 160 stands in the dot and dash line position indicated "2nd." The main water valve 164 is open but very little, but the exhaust valves 5, etc. are closed so that water cannot enter the engine cylinders through the partly open main valve.

Now move the lever 147 to the last notch 157. During the passage between notches 156 and 157 the broken ring contacts 135, etc. are brought into engagement with the corresponding contacts 131 etc., before the ring 145 is entirely disengaged from the working solenoid contacts 141, hence energizing the retaining magnets 82, 117, 118 and 104 before the working solenoids 80, 114, 115 and 116 can be deenergized to release the cores 79 of the exhaust valves. The retaining magnets 82 etc. then function to hold the exhaust valves down when the working solenoids 80, etc., are deenergized.

The circuit energizing the retaining magnet 82 when the broken ring 135 engages the contact 131 is as follows: Current flows from the positive pole of battery B over main positive wire 87 to branch 88, through the retaining magnet 82, over wire 129ª to contacts 131 and ring 135 back to the other part of wire 129ª over main wire 129 to retaining contact 111 of cylinder 3, to ground and so back to the negative pole of the battery. Remember that all intake valves 6 etc. are closed and consequently the retaining contacts 111 are also closed, completing the circuit through the retaining magnets as just traced.

The retaining magnet 117 is energized by the engagement of the ring 136 with contact 132 in this manner: Current flows from the positive pole of battery B over main positive wire 87 to branch 88 of the second engine cylinder, through retaining magnet 117 to wire 130, over branch 130ª through contact 132 and ring 136 to the other branch 130ª, over wire 130 to the retaining contact 111 of cylinder 4, there to ground, and so back to the negative pole of the battery. The circuit for the retaining magnets 118 and 104 may be easily traced in the same manner on the drawings.

Upon completing the movement of the lever 147 the main valve 164 will stand fully opened, the ring 145 will be out of engagement with the working solenoid contact 141, consequently deenergizing the working solenoids 80 etc. but the broken rings 135 etc. will be in full engagement with the contacts 131 etc., holding the retaining magnets 82 energized. These magnets are weak. They are strong enough to hold the cores 79 etc. when brought into engagement with the fixed cores 81 etc., but not strong enough to attract the former cores when the exhaust valves are open. The operator should now turn the button 152 in the direction of the arrow.

The breaks in the rings 135 etc. are arranged on a bias. A slight turn of the button 152 will convey the break of the first ring 135 beneath the contact 131 and so break the circuit through the retaining magnet 82 of engine cylinder 1. Should this function fail to occur, the operator may turn the button 152 a little farther to bring the break of ring 136 beneath the contact 132 and so break the circuit through the retaining magnet 117. On the same principle, all of the retaining magnets may be deenergized in an effort to start the engine. But the first break should start the engine, and it does start on this wise:

Upon releasing the core 79 by the deenergization of retaining magnet 82, the exhaust valve 5 of cylinder 1 moves to the open position by virtue of the tension of the spring 75. The inlet port 19 now communicating with the inlet conduit 16, admits water to the cylinder 1. Any residual gas is forced out through the top through the open exhaust port 18. The fluid piston, for such the water has now become, rises until it meets the float 84, which in turn rises with the fluid piston bringing the float contact 83 into engagement and closing the following circuit:

Current flows from the positive pole of battery B over main positive wire 87 to branch 88, through the working solenoid 80 to the negative return wire 89, past the float contact 83 to ground at the cylinder, and so back to the negative pole of the battery. The working solenoid 80 is energized, draws the core 79 down and again closes the exhaust valve 5. On this downward or closing movement, the intake contact 92 is momentarily engaged. It is shown in engagement in Figure 12 merely to enable the reader to follow the completed circuit by which the intake valve 6 is opened;

Current flows from the positive pole of battery B over main positive wire 87 to the intake solenoid 90, over negative return wire 91 to the intake contact 92, from there to ground at the engine and so back to the negative pole of the battery. The energization of the intake solenoid 90 draws the movable core 99 up, moves the intake valve 6 up so that a charge of gas under compression may enter the cylinder 1 through the port 20 and occupy the space above the fluid piston W.

But as stated before, the completion of the circuit at the intake contact 92 is but momentary, the functioning of this contact being remembered from the description of Figure 6. As soon as the roller 93 leaves the corresponding contact point, the intake solenoid 90 is again deenergized, permitting the spring 98 to force the intake valve 6 down to the closed position, thereby cutting off the flow of gas. Two things happen on the downward or closing movement of the intake valve.

First, the spark circuit is completed at the terminal 109, the primary circuit being completed at that terminal, in turn causing the completion of the high tension circuit from the coil C, wire 113 and spark plug 21. The production of the spark causes the ignition of the compressed charge of gas, forcing the fluid piston W down and out of the bottom valve 22. The compressor piston 26 is impacted by the ejected fluid, compressing the air beneath the piston, but the fluid flowing into the reservoir 30 to drive the rotors of the turbine 15.

Secondly, the terminal 110 is engaged by the roller 105 of the retaining contact 111 closing the following circuit: Current flows from the positive pole of battery B over the main positive wire 87 to branch 88 of cylinder 4, through the retaining magnet 104, over wire 112, branch wires 112ª through main switch Sw and out again into wire 112, terminal 110 of the retaining contact 111 to ground at the engine, and so back to the negative pole of the battery. The reader will ask how it could be possible to energize the retaining magnet 104 when it was supposed to be energized in the first instance to retain the core of the exhaust valve in the down position.

This question is answered thus: When the intake solenoid 90 was energized by the functioning of intake contacts 92 to open the intake valve 6, the circuit which was formerly completed at the terminal 110 of the retaining contact 111 was broken, thereby giving the spring 75 of the exhaust valve 11 an opportunity to force that valve into the open position, in which it is now illustrated in Figure 13. That valve is still open and the energization of the retaining magnet 104 by the re-establishment of its energizing circuit at the terminal 110 of the intake valve 6, does not close the exhaust valve 11 because it is remembered that the retaining magnet 104, like the others, is insufficiently strong to attract the core 79.

The operation of cylinder No. 1 is now repeated in cylinder No. 4. The fluid piston W rises until the float 84 of cylinder 4 is lifter, whereupon the float contact 83 is closed, energizing the intake solenoid 124 by the completion of the following circuit: Current flows from the positive pole of battery B over the main positive wire 87 to branch 88, through solenoid 116 to the wire 121, past the float contact 83 to ground at the cylinder 4, and so back to the negative pole of the battery. It is unnecessary to repeat the rest of the description, a synopsis of the description of the whole operation being given in the appended schedule:

Cylinder 1—Exhaust valve 5 closes to open intake valve 6, intake valve 6 releases exhaust valve 11.

Cylinder 2—Exhaust valve 7 closes to open intake valve 8, intake valve 8 releases exhaust valve 9.

Cylinder 3—Exhaust valve 9 closes to open intake valve 10, intake valve 10 releases exhaust valve 5.

Cylinder 4—Exhaust valve 11 closes to open intake valve 12, intake valve 12 releases exhaust valve 7.

This schedule illustrates that each exhaust valve controls its own gas intake valve. Each cylinder closes its own exhaust valve when the fluid piston reaches the proper height in the engine cylinder. Each intake valve produces the spark for its own intake cylinder and then operates to set another engine cylinder in readiness for a repetition of the operation which has just been performed in its own cylinder.

In completing the description of the operation in progress immediately before the schedule above, only mention of the positions of parts in Figure 13 need be made. Here it will be observed that the fluid piston W of cylinder 4 has reached the top, has completed the circuit for itself to energize the working solenoid 16, thereby closing the exhaust valve 11 and causing the opening of the intake valve 12 for the admission of a charge of compressed gas. The exhaust valve 5 of cylinder 1 is still closed, since the fluid piston is still in the act of moving out of the bottom valve 22.

When all of the fluid is ejected from cylinder 1, that cylinder remains at rest until cylinders 2 and 3 have operated, and when the intake valve 10 of cylinder 3 performs its functions, the exhaust valve 5 of cylinder 1 is again released to repeat the operations described at the beginning of this subject.

In conclusion, attention is directed to the provision of a small turbine 166 for driving the electric generator 167, shown in Figure 3. The use of this generator or the battery B is optional. When the former is used, fluid under pressure is taken from a suitable part of the fluid piston and again returned at the most convenient place.

It is stated above that the sole purpose of compressing the air in the air reservoir at the bottom is to provide a charge under pressure. This is correct and applies to the ordinary operation of the engine. But the engine is capable of uses other than the mere driving of a generator and the like, for example, when made on a sufficiently large scale it can be used as an air compressor.

In such event, the air compressed in the chamber at the bottom is not solely used for the formation of a charge, only in a relatively small degree; most of the compressed air is then made use of otherwise. There is also another important modification to which the engine readily lends itself.

The water which is expelled under great force against the compressor pistons is now used almost solely for the driving of the turbine, incidentally serving to cool the cylinders. The engine may be made on a considerably larger scale and used as a water pump. Describing briefly how this may be done, the reader should imagine the water to be raised from such external place as a well by means of a small pump, whereupon it may momentarily function as the fluid piston of the engine, being expelled at the bottom valve under great force and thus raised to a considerable height. All this the reader can readily picture to himself and illustration in the drawings is not thought to be required.

While the construction and arrangement of the improved hydro-gas engine as herein described and claimed, is that of a generally preferred form, obviously modifications and changes may be made without departing from the spirit of the invention or the scope of the claims.

I claim:—

1. An engine comprising a cylinder, a valve having a port admitting fluid into the cylinder while in a normally open position, electro-magnetic closing means for the valve, and contact means actuated by the piston formed by said fluid when the latter reaches a predetermined inward point in the cylinder to energize said electro-magnetic means, close the valve and stop the inflow of fluid.

2. An engine comprising a cylinder, a valve having a port admitting fluid to form a piston in the cylinder, means to keep the valve normally open to admit said fluid, electric mechanism for moving said valve contrary to said opening means, and float-controlled contact means set in operation by the piston when the latter reaches a predetermined inward point in the cylinder for setting said electric mechanism in operation and moving the valve to the closed position.

3. An engine comprising a cylinder, a valve having a port admitting fluid to form a piston in the cylinder, means to keep the valve normally open, a normally deenergized solenoid, a stem on the valve entering the solenoid as a core, an electric circuit embracing the solenoid having a grounded terminal, a closable terminal, and a float situated in the cylinder operated when the piston reaches a predetermined inward point to thereby close said terminal and energize the solenoid to shift the valve to a closing position.

4. An engine comprising a cylinder, a normally open valve having one port to admit fluid into the cylinder to constitute a piston and another port which permits the escape of gas from the cylinder ahead of the piston, and means set in operation by the fluid piston when touched by said piston at a predetermined inward point for shifting the valve to close both ports.

5. An engine comprising a cylinder, a normally open valve with ports to admit fluid into the cylinder to constitute a piston and permit the escape of gas from the cylinder ahead of the piston, means set in operation by the fluid piston when it reaches a predetermined inward point for shifting the exhaust valve to close both ports, a normally closed intake valve, and means actuated by the valve on the closing movement thereof to open the intake valve and admit a compressed charge of gas ahead of the fluid piston.

6. An engine comprising a cylinder, a normally open valve with ports open to respectively admit fluid into the cylinder to constitute a piston and permit the escape of gas from the cylinder ahead of the piston, means set in operation by the fluid piston when it reaches a predetermined inward point for shifting the valve to close both ports, a normally closed intake valve, means actuated by the first valve on the closing movement thereof to open the intake valve and admit a compressed charge of gas ahead of the fluid piston, means for immediately again closing the intake valve, and means set in operation by the closing movement of the intake valve for igniting said charge.

7. An engine comprising a cylinder, a normally open valve having ports to respectively admit fluid into the cylinder to constitute a piston and permit the expansion of gas ahead of the piston, electric means actuated when the piston nears the exhaust port to shift the valve and close both ports, a normally closed intake valve, electric means momentarily energized on the closing movement of the fluid and exhaust valve to open the intake valve and admit a charge of air, means for immediately closing the intake valve, electric means energized on the closing movement of said valve to ignite the charge, and means against which the fluid piston reacts to utilize the force therebehind.

8. An engine including a pair of cylinders, a valve for each cylinder, each having a port, the first valve being in such position that the port is open for admitting fluid into the adjacent cylinder to constitute an advancing fluid piston, the second valve being in such position that the port is closed, electric means retaining said valve and port in the closed position, a normally closed intake valve on the first cylinder, contact means associated with said intake valve maintaining a circuit while closed through said retaining means, electric means actuated when said fluid piston reaches a predetermined inward point to cause the first valve and fluid port to close, electric means actuated by said valve when closing to open the intake valve for the admission of a charge of gas thereby breaking the circuit of said retaining means and permitting the valve and fluid port of the other cylinder to open; and means for again closing said intake valve to re-establish said circuit but not close the second valve.

9. An engine including a pair of cylinders, a normally closed gas intake valve for the first cylinder, a combined fluid inlet and gas exhaust valve for the second cylinder, electro-magnetic means adapted for retaining said combined valve in the closed position, an electric circuit embracing said electro-magnetic retaining means, means carried by said intake valve closing said circuit when the intake valve is closed to thereby retain said combined valve, means for opening said intake valve and thereby opening said circuit to release the combined valve, and means for then moving the combined inlet and exhaust valve to the open position.

10. An engine having a pair of cylinders, a normally closed gas intake valve for the first cylinder, a valve for the second cylinder having a fluid port and a gas exhaust port, a magnet adapted to retain the exhaust valve in the closed position, an electric circuit, means at the intake valve to engage the terminals of said circuit to energize the retaining magnet upon closure of the intake valve and vice versa, and means for moving the fluid and gas valve to an open position to admit a fluid piston into the second cylinder.

11. An engine having a cylinder, an exhaust valve having a fluid inlet port, a stem on the valve, a magnet adapted to be energized to attract said stem and hold the valve in the closed position, means to deenergize and energize said magnet to alternately release and attract the stem, means to open the valve upon deenergization of said magnet to admit fluid through said port to form a piston in the cylinder, a normally deenergized working solenoid coupled with said magnet, and contact mechanism actuated by the inwardly advancing fluid piston at a predetermined point to energize the working solenoid and draw the exhaust valve and port to the closed position within range of the deenergized retaining magnet.

12. An engine having a cylinder, a valve having a port adapted to admit fluid to form a piston in the cylinder, an energized retaining magnet holding the valve and port normally closed; external means adapted to break the circuit through the retaining magnet to release said valve, and again complete the circuit, means for moving the valve and port to the fluid-piston admitting position when said valve is released, and electric mechanism for closing said valve and holding it by said retaining magnet, said mechanism including a contact actuated by the inwardly advancing fluid piston and a working solenoid energized therethrough.

13. An engine having a cylinder, a valve having a port adapted while open to admit a fluid into the cylinder to form a piston, a stem on the valve, a contact arm journalled in the cylinder wall having an extension on the inside, a guide inside of the cylinder, a float mounted on said guide movable by the piston to engage the extension, a working solenoid receiving the stem, a circuit embracing the solenoid and having a contact engageable by said arm to thereby energize the solenoid, attract the stem and move the valve into the closed position.

14. An engine comprising a cylinder having a normally closed gas intake valve, a normally open valve having gas exhaust and fluid intake ports the latter adapted to admit fluid to form a piston in the cylinder, cylinders containing the respective valves, electrical contact means on the engine cylinder operable by the piston, electro-magnetic means energized upon operation of said contact means when the piston reaches a predetermined inward point to thereby cause the closure of the valve having the exhaust and fluid port, electro-magnet means for opening the intake valve, contact means carried by the gas and fluid valve extending through the cylinder wall of said valve, associated electrical contact means engagable thereby momentarily to energize said electro-magnetic means and cause the opening of the intake valve, and means for returning said valve to the closed position after said momentary contact and deenergization of said electro-magnet means.

15. An engine comprising a working cylinder, a pair of valve cylinders, a normally closed intake valve in one cylinder, a normally open gas and fluid inlet valve in the other cylinder, each valve having a core, solenoids receiving the cores of the intake and exhaust and inlet valves respectively, means actuated by the advancing column of fluid entering at the inlet of the former valve to energize one of the solenoids to close the exhaust and intake valves, and means actuated by said closing valve to energize the other solenoid and open the intake valve.

16. An engine having a movable gas intake valve, an operating solenoid therefor, a second movable valve, a circuit embracing the solenoid and having one terminal adjacent to the second valve, a contactor carried by said valve, and means carrying said terminal arranged to shield the latter upon one movement of the contactor but enabling engagement thereof on the reverse movement to close the circuit and energize said operating solenoid.

17. An engine comprising a cylinder, a valve having a port to admit fluid to form a piston in said cylinder, and fixed means extending inwardly from the cylinder wall preventing excessive splashing of the fluid as it approaches the top of the cylinder.

18. An engine comprising a cylinder, a valve having a port to admit fluid into the cylinder to form a piston, and a baffle carried by and extending inwardly from the cylinder wall preventing excessive splashing of the fluid as it approaches the top of the cylinder.

19. An engine comprising a cylinder, means providing a closure for the bottom of the cylinder, means to admit fluid into the cylinder to form a piston, yieldable means beneath said closure holding it in place, means for admitting and igniting an explosive mixture above the fluid piston whereby said closure means is displaced, and means arranged below said closure means to receive the impact of the fluid as it escapes.

20. An engine comprising a cylinder, means providing a closure for the bottom of the cylinder, means to admit fluid into the cylinder to form a piston, means to admit and ignite an explosive mixture above the fluid piston, resilient means normally holding the closure means in place but permitting yielding to the force of the explosion against said piston, means impacted by the escaping fluid and in turn becoming displaced to compress a fluid therebehind, and means directing the escaping fluid against said impacted means.

21. An engine comprising a cylinder, means providing a closure for the bottom of the cylinder, means to admit fluid into the cylinder to form a piston, means to admit and ignite an explosive mixture above the fluid piston, resilient means normally supporting the closure means and holding it in place but permitting yielding to the force of the explosion against said piston, impact means in position to be impacted by the escaping fluid, a cylinder containing said impact means, yieldable means supporting said impact means in turn becoming displaced to compress a fluid in the impact cylinder, means directing the escaping fluid against said impact means, means receiving the fluid partially spent after displacing the closure means, and means for receiving the fluid compressed in the impact cylinder.

22. An engine comprising a cylinder adapted to contain a fluid piston, means providing a bottom for the fluid piston, resilient means retaining the bottom but enabling displacement by the force of an explosion on the piston, means for guiding the escaping fluid under pressure, means for receiving the impact of said fluid to in turn compress fluid therebehind, and means including a reservoir for receiving the fluid under pressure.

23. An engine comprising a cylinder, means providing a closure for the bottom of the cylinder, means to admit fluid into the cylinder to form a piston, means to admit and ignite an explosive mixture above the fluid piston, a spring normally supporting said bottom but enabling yielding to the force of the explosion above said piston, means guiding the escaping fluid rectilinearly when said closure is displaced, means within said guide means supporting said spring, a reservoir receiving the escaping fluid, an extension cylinder spaced from said engine cylinder to communicate with the reservoir, a compressor piston in said extension cylinder receiving the impact of said rectilinearly guided fluid and in turn compressing a fluid in said extension cylinder, and a spring normally supporting said compressor piston, being adapted to yield proportionately as the fluid pressure in the reservoir thereabove increases.

24. An engine comprising a cylinder having a valve seat and a plurality of grooves leading therefrom to one end of the cylinder, a valve resting on said seat providing a closure for the bottom of the cylinder, means to admit fluid into the cylinder to form a piston, means to admit and ignite an explosive mixture to form a piston, a spring normally supporting said valve but enabling yielding to the force of the explosion above said piston, said grooves guiding the escaping fluid rectilinearly when said valve is displaced, means within said cylinder supporting said spring, an extension cylinder spaced from the engine cylinder, a reservoir with which the space communicates, a compressor piston in position to receive the impact of said rectilinearly guided fluid and in turn compress a fluid in said extension cylinder therebeneath, and a spring in said cylinder supporting said compressor piston and yielding proportionately as the fluid pressure in the reservoir thereabove increases.

25. An engine comprising a pair of opposed cylinders spaced apart, a reservoir enclosing portions of the cylinders to communicate with said space, a valve in one of the cylinders, means to admit fluid to said cylinder above the valve therein to form a piston, means to admit and ignite a combustible charge above said piston causing said valve to recede and permit the expulsion of the fluid piston into said space, air inlet means in said other cylinder, and a piston in said other cylinder receiving the thrust of the expelled fluid piston to compress the air therein before entering the reservoir.

26. An engine comprising a pair of opposed cylinders spaced apart, a reservoir enclosing the opposing ends of the cylinders to communicate with said space, a valve in one of the cylinders, means to admit fluid to said cylinder above the valve therein to form a piston, means to admit and ignite a combustible charge above said piston, causing said valve to recede and permit the expulsion of the fluid piston into said space, air inlet and outlet valves in the other cylinder, a reservoir into which the outlet valve is adapted to open, and a piston in said other cylinder receiving the thrust of the expelled fluid piston to compress the air therein before entering the reservoir, said compressed air discharging through the outlet valve into the air reservoir.

27. An engine comprising a cylinder, a valve closing one end thereof, a head closing the other end, means to admit a fluid to form a piston in said cylinder, charge-forming means to introduce a combustible charge into the cylinder between the piston and head, means to ignite the charge, compressor apparatus including a piston to receive the impact of the fluid upon expulsion through said valve by the explosion, a reservoir into which air is compressed by said piston, and a pipe connected between the reservoir and charge forming means to supply the latter with air for forming combustible charges.

28. An engine comprising a cylinder, a valve closing one end thereof, a head closing the other end, means to admit a fluid to form a piston in said cylinder, charge-forming means to introduce a combustible charge into the cylinder between the piston and head, a baffle situated adjacent to the head defining a compartment which the charge enters, said baffle preventing excessive splashing of the fluid piston as the head is approached, means to ignite the charge, compressor apparatus including a piston to receive the impact of the fluid upon expulsion through said valve by the explosion, a reservoir into which air is compressed by said piston, and a pipe connected between the reservoir and charge-forming means to supply the latter with air for forming combustible charges.

29. An engine comprising a cylinder, a valve in said cylinder adapted to support a fluid piston, an inlet valve admitting the fluid to form said piston, means to close said valve, a compressor cylinder, a piston in said cylinder adapted to receive the impact upon expulsion of the fluid through said valve to compress air in said compressor cylinder, a reservoir into which said air discharges, a carbureter between said reservoir and the top of the cylinder being adapted to form a combustible charge for induction into said cylinder above said fluid piston, an intake valve for admitting said compressed charge above the piston, electro-magnetic means adapted to be momentarily energized to open said intake valve, and circuit controlling means operable upon the closing movement of said inlet valve to energize said electro-magnetic means for the opening of the intake valve.

30. An engine comprising a cylinder, a valve in said cylinder adapted to support a fluid piston, an inlet valve having a port in open position to admit the fluid to form said piston and a second port to exhaust a previously burnt charge ahead of the advancing fluid piston, means to close said valve, a compressor cylinder, a piston in said cylinder adapted to receive the impact upon expulsion of the fluid through said valve in said compressor cylinder, a reservoir into which said air discharges, a carbureter between said reservoir and the top of the cylinder being adapted to form a combustible charge for induction into said cylinder above said fluid piston, an intake valve for admitting said compressed charge above the piston, electro-magnetic means adapted to be momentarily energized to open said intake valve, and circuit controlling means operated upon the closing movement of said inlet valve to energize said electro-magnetic means for the opening of the intake valve.

31. An engine comprising a cylinder, a valve in said cylinder adapted to support a fluid piston, an inlet valve having a port in open position to admit the fluid to form said piston and a second port to exhaust a previously burnt charge ahead of the advancing fluid piston, electro-magnetic means operable by the fluid piston upon advance thereof to a predetermined point in the cylinder to close said valve, a compressor cylinder, a piston in said cylinder adapted to receive the impact upon expulsion of the fluid through said valve to compress air in said compressor cylinder, a reservoir into which said air discharges, a carbureter between said reservoir and the top of the cylinder being adapted to form a combustible charge for induction into said cylinder above said fluid piston, an intake valve for admitting said compressed charge above the piston, electro-magnetic means adapted to be momentarily energized to open said intake valve, and circuit controlling means operable upon the closing movement of said inlet valve to energize said electro-magnetic means for the opening of the intake valve.

32. An engine including a cylinder having a valve seat, a valve engaging the seat from beneath to support a fluid piston, resilient means normally sustaining the valve but enabling yielding when an explosion occurs above the piston, means included in said seat causing centering of the force behind the fluid piston on the valve, and other means embodied in the seat enabling spreading of the fluid escaping around the unseated bottom valve, toward the cylinder wall below the valve seat.

33. An engine comprising a cylinder adapted to contain a fluid piston, a valve supporting the fluid piston, means for admitting a compressed charge of gas above said piston, means for igniting said charge, means including a reservoir for receiving the fluid under pressure as it escapes at the bottom valve due to the explosion of the gas, a jacket around the cylinder, means for conducting said fluid to the jacket to cool the cylinder, and means for receiving the hot fluid from the jacket for cooling it before returning it to the cylinder, including a radiator.

34. An engine comprising a cylinder adapted to contain a fluid piston, a valve supporting the fluid piston, means for admitting a compressed charge of gas above said piston, means for igniting said charge, means including a reservoir for receiving the fluid under pressure as it escapes at the bottom valve due to the explosion of the gas, a jacket around the cylinder, means for conducting said fluid to the jacket to cool the cylinder, means for receiving the hot fluid from the jacket for cooling it before returning it to the cylinder, including a radiator, and means for admitting a portion of the cooled fluid to again become a fluid piston comprising a valve having a fluid port and gas port, both opening to respectively admit the fluid and permit the expulsion of the previously burnt charge.

35. An engine comprising a cylinder, adapted to contain a fluid piston, a bottom valve for supporting the fluid piston, an intake valve adapted to assume two positions namely, an open position to admit a charge of gas ahead of the piston, and a closed position after said admission, means actuated by said valve in moving to said closed position to cause the ignition of said charge; a reservoir for receiving the fluid expelled from the cylinder through said bottom valve following the explosion, means for conveying said discharged fluid around the cylinder to carry away the heat, and means for receiving said fluid to cool it.

36. An engine comprising a cylinder adapted to contain a fluid piston, displaceable means providing a support in said cylinder for said piston, means to admit and ignite a combustible charge above said piston, a reservoir for receiving the fluid upon expulsion past said support under pressure of the explosion above the piston, means surrounding the cylinder to which the fluid is conducted for conveying away the heat, and adjustable pressure-controlled means providing a by-pass between the reservoir and said surrounding means, operable in the event of excessive pressure in the reservoir.

37. In an engine, the combination of an electric switch including a movable contactor, means for moving it in a succession of impulses, an operatively associated valve controlling the flow of fluid to the engine, and a connection between the contactor and said valve permitting a predetermined amount of movement of the contactor before the opening of the valve begins.

38. In an engine the combination of a normally closed fluid valve, an electric switch including a normally retracted contactor, means for advancing the contactor step by step, connecting means between the contactor and valve, and means embodied in said connecting means enabling a predetermined number of steps of the contactor before the fluid valve is affected.

39. In an engine the combination of a normally closed fluid valve, an electric switch including a normally retracted contactor, means, including a lever with connections, for shifting the contactor step by step, connecting means between the contactor and valve, and means including slot and pin devices permitting a predetermined number of steps of the contactor before the opening of the valve is begun.

40. In an engine the combination of a normally closed fluid valve, an electric switch including a contactor with a connection to the valve, means for shifting the contactor with a step by step motion, means in said connection enabling a predetermined number of steps before the valve is affected, means permitting turning of the contactor, and means in said connection permitting said turning without affecting the connection.

41. In an engine, the combination of electromagnetic valve operating means, a switch including a series of relatively fixed contacts in electrical connection with said electromagnetic means, relatively movable contactors in normal disconnection, and means for moving one of the contactors over certain of the contacts a predetermined distance to initiate the operation of certain valve operating means, thereafter moving all contactors together to subsequently initiate the operation of the other valve operating means.

42. In combination, an engine employing a fluid piston, fluid inlet and gas intake valves, separate electromagnetic means for the respective valves, a normally closed main valve for the fluid which is adapted to constitute the piston, an electric switch having contacts in connection with the various electro-magnetic means, movable coacting contactors embodied in said switch, a connection between one contactor and the valve, means for moving one of the contactors a predetermined distance to cause the energization of one of the electro-magnetic means and initiate the operation of the inlet valve, the continued movement of said contactor carrying said connected contactor with it to cause the opening of the main fluid valve thereby establishing fluid circulation through the engine and energizing others of the electromagnetic means.

43. An electric switch comprising a contact plug, means to both reciprocate and revolve said plug, a stem carried by the plug adapted to reciprocate to shift a valve handle, and a connection between the stem and the plug enabling the valve to revolve without affecting the stem.

44. An electric switch comprising two contact-carrying plugs, non-circular means passing through one plug to a point of attachment on the other plug, means to reciprocate said other plug in respect to the first plug and revolve both plugs together, a stem carried by said other plug with means adapting it to shift a valve handle, and a joint between the stem and said other plug enabling the revolution of both plugs in respect to the stem and the reciprocation of said stem and said other plug in respect to the first plug.

FRANK D. CROWDER.